(12) United States Patent
Anderson et al.

(10) Patent No.: US 8,459,615 B2
(45) Date of Patent: *Jun. 11, 2013

(54) WINCH ASSEMBLY

(75) Inventors: Eric Anderson, Plover, WI (US); Joseph J. Peschmann, Plover, WI (US); Kawa-She-Quoen Okerlund, Wittenberg, WI (US); Todd Walstrom, Weston, WI (US)

(73) Assignee: Cequent Performance Products, Inc., Plymouth, MI (US)

( * ) Notice: Subject to any disclaimer, the term of this patent is extended or adjusted under 35 U.S.C. 154(b) by 59 days.

This patent is subject to a terminal disclaimer.

(21) Appl. No.: 13/169,871

(22) Filed: Jun. 27, 2011

(65) Prior Publication Data
US 2011/0253958 A1 Oct. 20, 2011

Related U.S. Application Data

(63) Continuation of application No. 12/558,252, filed on Sep. 11, 2009, now Pat. No. 7,967,278.

(60) Provisional application No. 61/191,682, filed on Sep. 11, 2008.

(51) Int. Cl.
*B66D 1/14* (2006.01)
(52) U.S. Cl.
USPC ............................. 254/356; 254/357; 254/376
(58) Field of Classification Search
USPC ................... 254/323, 342, 356, 357, 376, 345
See application file for complete search history.

(56) References Cited

U.S. PATENT DOCUMENTS

| | | | | |
|---|---|---|---|---|
| 1,806,606 A * | 5/1931 | Booth | ............................ | 254/342 |
| 2,495,811 A * | 1/1950 | Hollmann | ...................... | 254/357 |
| 4,268,012 A * | 5/1981 | Ruehle et al. | ................. | 254/223 |
| 4,320,672 A * | 3/1982 | Segawa | ......................... | 475/297 |
| 4,884,784 A * | 12/1989 | Nix et al. | ....................... | 254/362 |
| 5,011,004 A * | 4/1991 | D'Amato | ....................... | 198/791 |
| 5,320,398 A * | 6/1994 | Popp et al. | ...................... | 296/76 |
| D364,027 S * | 11/1995 | Hung | ............................. | D34/33 |
| 5,593,139 A * | 1/1997 | Julian | ............................ | 254/325 |
| 6,431,525 B1 * | 8/2002 | Roll | ............................... | 254/357 |
| 7,121,599 B2 * | 10/2006 | Demar et al. | ................... | 294/60 |
| 7,226,039 B2 * | 6/2007 | Sauner et al. | ................. | 254/323 |
| 7,374,379 B2 * | 5/2008 | Booher | ......................... | 410/103 |
| 7,484,713 B1 * | 2/2009 | Young | ........................... | 254/342 |
| 2008/0185564 A1 * | 8/2008 | LaFreniere | ................... | 254/342 |

* cited by examiner

*Primary Examiner* — Emmanuel M Marcelo
(74) *Attorney, Agent, or Firm* — McDonald Hopkins, LLC (57) ABSTRACT

The present invention is directed to apparatus for a winch assembly. The winch assembly may be secured to a towing trailer and arranged to assist in loading and unloading cargo from the trailer. The winch assembly may include mechanisms, systems, and features to make the winch assembly easy to assemble and use, increase the service life of the winch assembly, and improve the consistency of the performance of the winch assembly. Embodiments of a winch assembly disclosed include novel drive systems, novel ratchet and pawl systems, novel systems for guiding a winch strap, novel systems for securing the winch assembly to a towing trailer, and a novel frame member for a winch assembly.

28 Claims, 13 Drawing Sheets

WINCH ASSEMBLY

CROSS-REFERENCE TO RELATED APPLICATION

This application is a continuation of prior U.S. patent application Ser. No. 12/558,252, filed on Sep. 11, 2009 now U.S. Pat. No. 7,967,278 which claims the benefit of U.S. Provisional Patent Application No. 61/191,682, entitled "Winch Assembly," filed on Sep. 11, 2008, which are both hereby incorporated by reference in their entirety.

FIELD OF INVENTION

The present invention relates generally to winch assemblies for towing trailers, and more particularly, to apparatus for improving the functionality, ease of use, and ease of assembly and maintenance of winch assemblies.

BACKGROUND

Towing trailers are designed to secure and haul cargo. Trailers may be arranged to haul specific types of cargo such as boats, automobiles, consumer products, and the like. Many such cargo items are large, heavy and difficult to move or maneuver onto the bed or frame of a towing trailer. To assist in moving or maneuvering the cargo onto a towing trailer, such trailers are often equipped with a winch. The winch assembly may commonly be attached to the tongue of the trailer. The winch may be connected to a cargo item by, for example, a strap, cable, rope, chain or the like for pulling the cargo item onto the trailer.

The winch assembly typically uses a handle to rotate a drum to wind the strap or cable around the drum and thus pull the cargo item towards the winch. The winch assembly may also be used to unload a heavy item by rotating the drum in the opposite direction to unwind a strap or chain to allow the cargo item to be slid off the trailer.

SUMMARY OF THE PRESENT INVENTION

An apparatus for a winch assembly is provided. In one embodiment, a winch assembly may include a one-piece frame having at least one side. The one piece frame may include a first aperture having a winch drum shaft held therein, a second aperture having a drive gear shaft held therein, a pawl aperture having a pin assembly held therein, and a plurality of spokes arranged to suspend the first aperture. The winch assembly may further include a drive system located within the frame, the drive system may include a winch drum, and at least one drive gear capable of engagement with the winch drum.

Further in an alternative embodiment, a winch assembly may include a frame and a drive system located within the frame. The drive system may include a winch drum including at least one drum gear, a drive shaft, and at least one drive gear located on the drive shaft and capable of engagement with the at least one drum gear. The winch assembly may also include a pin located through the frame, where the pin is capable of engagement with a feature of the drive system other than the at least one drive gear, and where the engagement limits rotation of the drive system.

In yet another alternative embodiment, a winch assembly may include a frame and a drive system located within the frame. The drive system may include a winch drum including at least one drum gear, a drive shaft, and at least one drive gear located on the drive shaft and capable of engagement with the at least one drum gear. The winch assembly may also include a ratchet and pawl assembly connected to the frame. The ratchet and pawl assembly may include a pin, where the pin is movable to engage the drive system to limit rotation of the drive shaft, a biasing member engaging the pin, the biasing member capable of biasing the pin into engagement with the drive system, and a knob connected to the pin to adjust the pin between a first position to allow rotation of the drive shaft in a first direction, a second position to allow rotation of the drive shaft in a second direction opposite the first direction, and a third position to allow rotation of the drive shaft in either the first or second directions.

In yet another alternative embodiment, a winch assembly may include a frame having at least two sides and a front face positioned between the two sides and a drive system located within the frame. The drive system may include a winch drum including at least one drum gear, a drive shaft, and at least one drive gear located on the drive shaft and capable of engagement with the at least one drum gear. The winch assembly may further include a pin connected with the frame, wherein the pin is movable to engage the drive system to limit rotation of the drive shaft, and a handle connected to the drive shaft to facilitate manual rotation of the drive shaft, where the pin is located on the front face and approximately centered between the two sides of the frame.

In yet another alternative embodiment, a winch assembly may include a frame, a drive system located within the frame. The drive system may include a winch drum including at least one drum gear, a drive shaft, and at least one drive gear located on the drive shaft and capable of engagement with the at least one drum gear. The winch assembly may also include a handle connected to the drive shaft to facilitate rotation of the drive shaft, where the handle includes a plurality of attachment features positioned along its length for selective attachment of the handle to the drive shaft at any attachment feature position.

Finally in yet another alternative embodiment, a winch assembly may include a frame, a drive system located within the frame. The drive system may include a winch drum including at least one drum gear, where each of the at least one drum gear includes a plurality of teeth, a drive shaft, and at least one drive gear located on the drive shaft and capable of engagement with the at least one drum gear. The winch assembly may also include a strap connected to the winch drum and capable of being wound on itself about the winch drum, and a strap guide connected to the frame, the strap guide positioned to overlap the teeth of the at least one drum gear to prevent the strap from contacting the teeth.

BRIEF DESCRIPTION OF THE DRAWINGS

Objects and advantages together with the operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the present invention.

Figure 1:
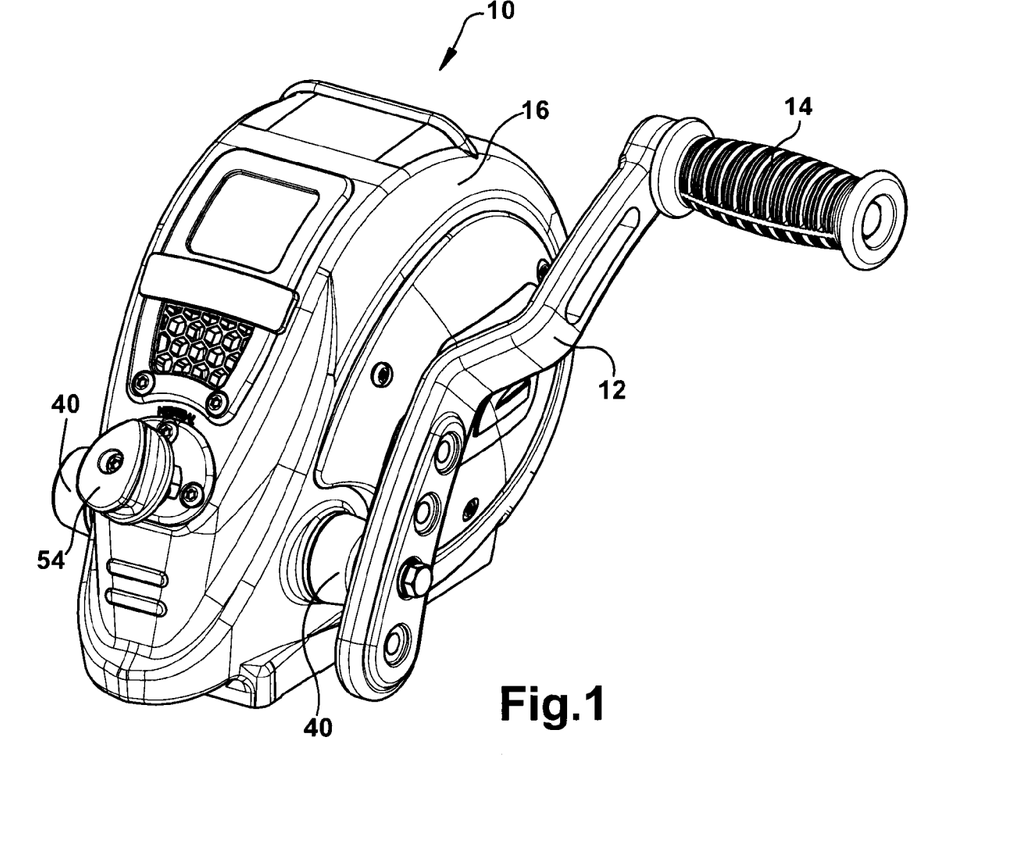
FIG. 1 is a perspective view of a winch assembly in an embodiment of the present invention.
Figure 7:
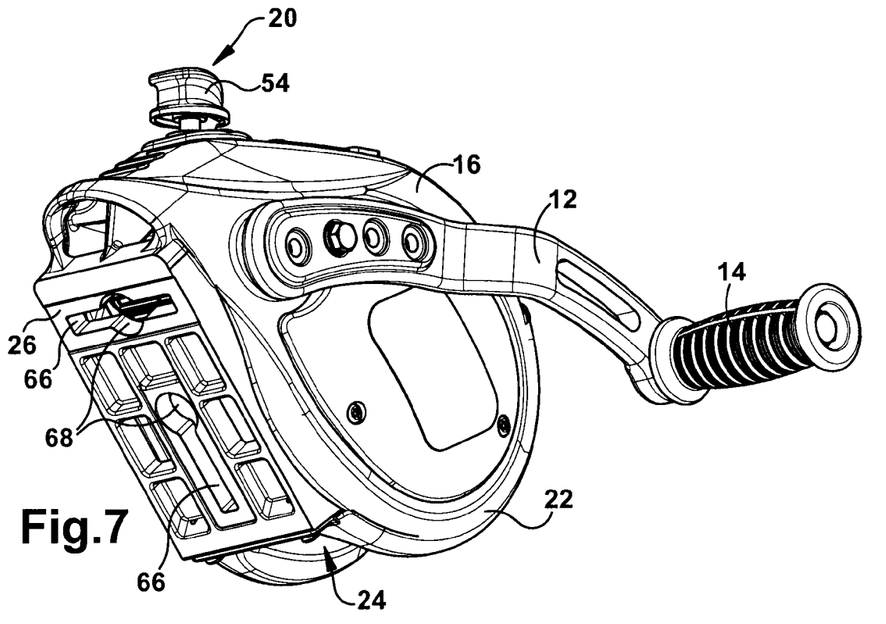
FIG. 7 is a perspective view of a winch assembly.

A winch assembly 10 is illustrated in FIG. 1. The winch assembly 10 may include a handle or crank 12, a grip 14, and a winch housing or frame 16 that may house the internal components of the winch assembly 10. The grip 14 may be secured to the handle 12 to facilitate the manual rotation of the handle 12. As best seen in FIG. 7, the winch frame 16 may also include a base plate 26 that may be configured to facilitate the securing or attaching of the winch assembly 10 to a winch stand or directly to a towing trailer, for example.

Figure 8:
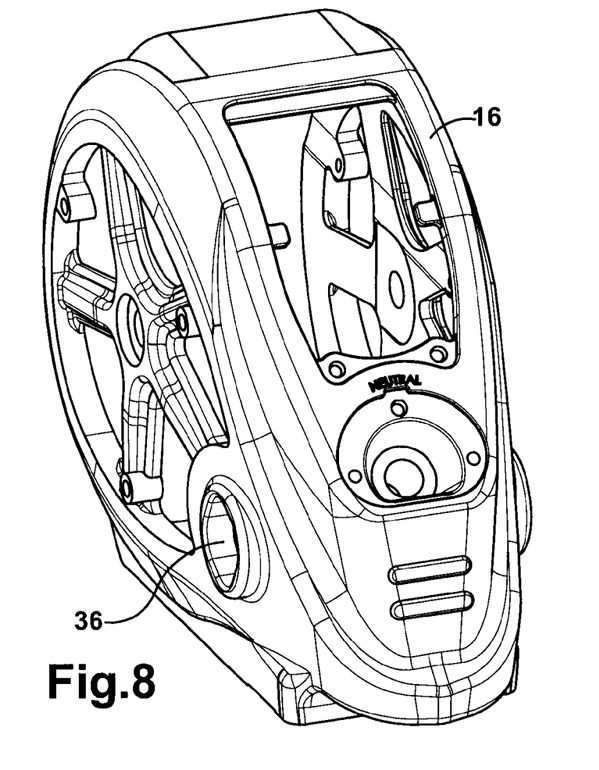
FIG. 8 is a perspective view of a frame for a winch assembly.

Most trailer winches are manufactured from a formed steel stamping. This material and process severely limits the features and aesthetics that can be incorporated into the design. As best seen in FIG. 8, the winch frame 16 may be fabricated as a one-piece die cast aluminum component. Such an arrangement may incorporate many desirable features, allow for pleasant aesthetics, provide for a high strength construction, and may make manufacturing easier. Die casting allows for the grooves 66 and apertures 68 of the base plate 26 to be incorporated into the frame 16, allows for precision control of dimensions of the frame 16, and allows for forming thicker sections to strengthen the frame 16.

As shown in FIGS. 2 through 6, the winch assembly 10 may also include a winch drum 18 and a ratchet and pawl system 20. The winch drum 18 and ratchet and pawl system 20 may be located within the winch frame 16 for selectively driving and locking the winch drum 20. The winch assembly 10 may be arranged to load and unload cargo onto a towing trailer by securing a strap (not show) to the cargo.

The strap may be attached to the drum 18 and pull cargo onto the trailer when the drum 18 is rotated in a first direction and allow cargo to slide off the trailer when the drum 18 is rotated in a second and opposite direction. The drum 18 may be located within the frame 16 and positioned on a shaft 46, such as a pin, for example. The drum 18 may be driven by the manual rotation of the handle 12. Disclosed herein is a novel drive system for driving the drum 18 to load and unload cargo. As will be described in detail, the winch drive system may be an adjustable floating winch system that may be driven by a hand operated adjustable crank handle 12.

In an embodiment, the drive system may include a drive shaft 28, a pair of outer bearings 30, a pair of inner bearings 32, and three drive gears 34. The outer and inner bearings 30, 32 may be slip bearings and are positioned to hold the drive shaft 28 to form a floating drive system. The bearings 30, 32 may be slip bushings that hold the drive shaft assembly in place creating a floating hex drive system. The drive shaft 28 may be hexagonal in cross-sectional shape. The three drive gears 34 may be slip fit onto the hexagonal drive shaft 28, and each drive gear 34 operates independent of the other two drive gears 34.

The outer bushings 30 may have a generally square outer surface, a generally circular inner surface, and include a flange. The outer bushings 30 may slide into coaxial apertures 36 in the winch frame 16. The frame apertures 36 may be arranged to match the generally square outer surface of the outer bushing 30 so that the outer bushing 30 will not rotate when located in the frame aperture 36. In one embodiment, outer bushings 30 may be fabricated from a polymeric material such as nylon.

The inner bushings 32 may have a generally circular outer surface and include a flange. The inner bushings 32 may be positioned within the outer bushings 30, where the circular inner surface of the outer bushings 30 matches the circular outer surfaces of the inner bushings 32. The inner surface of the inner bushings 32 may have a hexagonal shape to accommodate the hexagonal shape of the drive shaft 28. In an embodiment, the inner bushing 32 may be fabricated from an oil impregnated self-lubricating bronze material. Such an arrangement may provide for an extended service life.

As will be understood, the outer and inner bearings 30, 32 may support the drive shaft 28 within the winch frame 16. The combination of the bearings 30, 32 functionally transforms the hexagonal outer surface of the drive shaft 28 to a circular outer surface to facilitate smooth and efficient rotation of the drive shaft 28 within the apertures 36 of the frame 16. As will further described below, such an arrangement provides for a drive system that functions smoothly even when encountering irregularities in drum gears due to manufacturing and assembly processes such as stamping and welding.

The three drive gears 34 positioned on the drive shaft 28 may be arranged to drive the winch drum 18 and to facilitate the locking of the drum 18. The drive gears 34 may be positioned within the frame 16 and between the left and right bushings 30, 32. The two outer drive gears 34a, 34c may engage the drum 18 to drive the drum 18. The drum 18 may be fabricated with an integral pair of drum gears 38. The two outer drive gears 34a, 34c may engage the pair of drum gears 38 to drive the drum 18 with an even and balanced force. As will be further described below, the middle drive gear 34b may function as a ratchet type plunger engagement device to control the locking and release of forward and reverse rotational motion of the winch drum 18. These gears 34 may be slip fit over the drive shaft 28 and function or operate independent of each other.

Figures 10A, 10B:
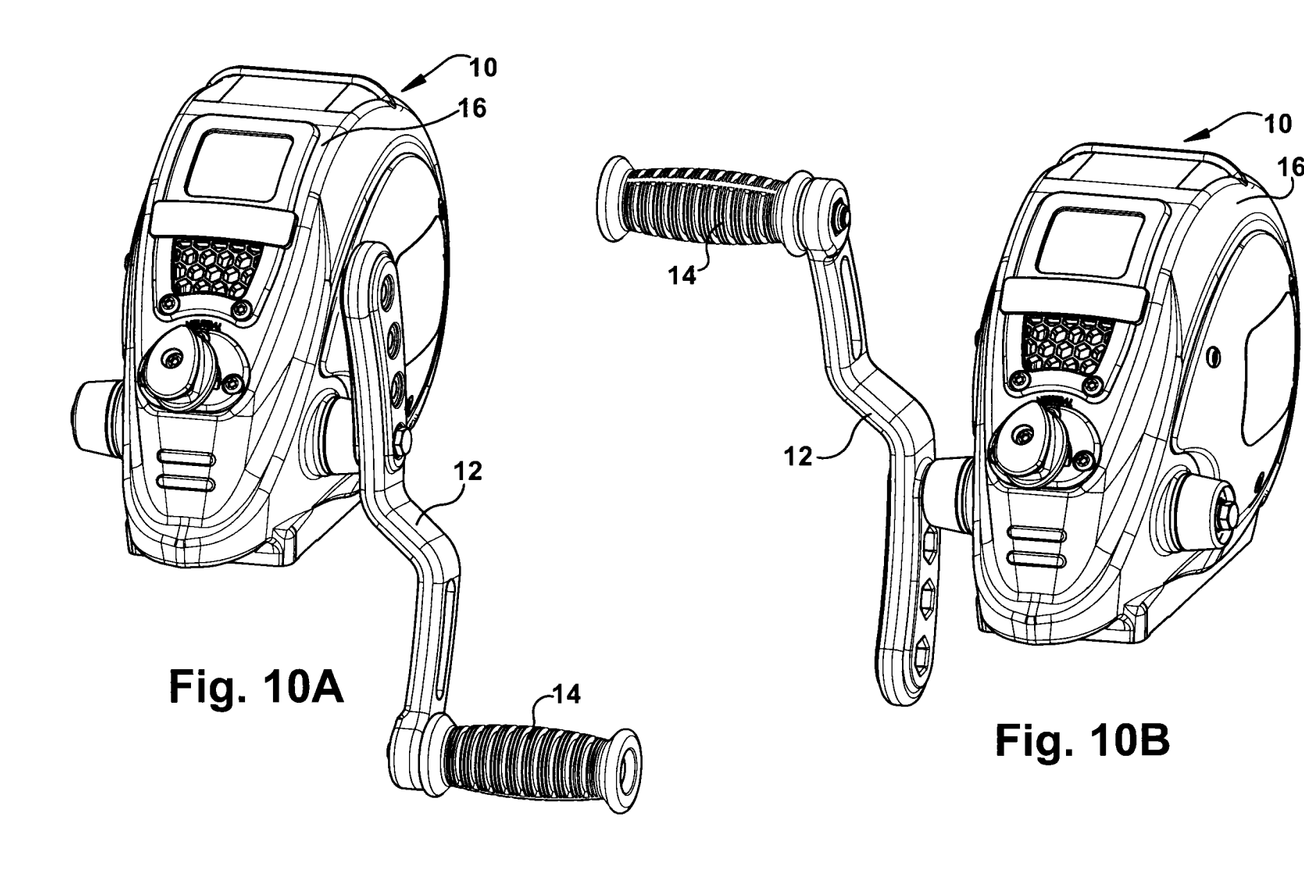
FIGS. 10A and 10B are perspective views of a handle attached for the left side and right side of a winch assembly.

In an embodiment, the drive shaft 28 may be fabricated as a one-piece steel drive shaft with apertures drilled and tapped on each end. Retaining caps 40 may be engaged with each end of the drive shaft 28 to hold the drive shaft 28 within the frame 16. Stainless steel washers 42, such as shim washers, may also be used to prevent wear between bushing surfaces. As illustrated in FIGS. 10A and 10B, the handle 12 may then be mounted on either end of the drive shaft 28 to permit right hand or left hand manual rotation of the handle 12 in a variety of possible length positions. The handle 12 and retaining cap 40 may be held in place by fasteners.

Figures 11A, 11B, 11C:
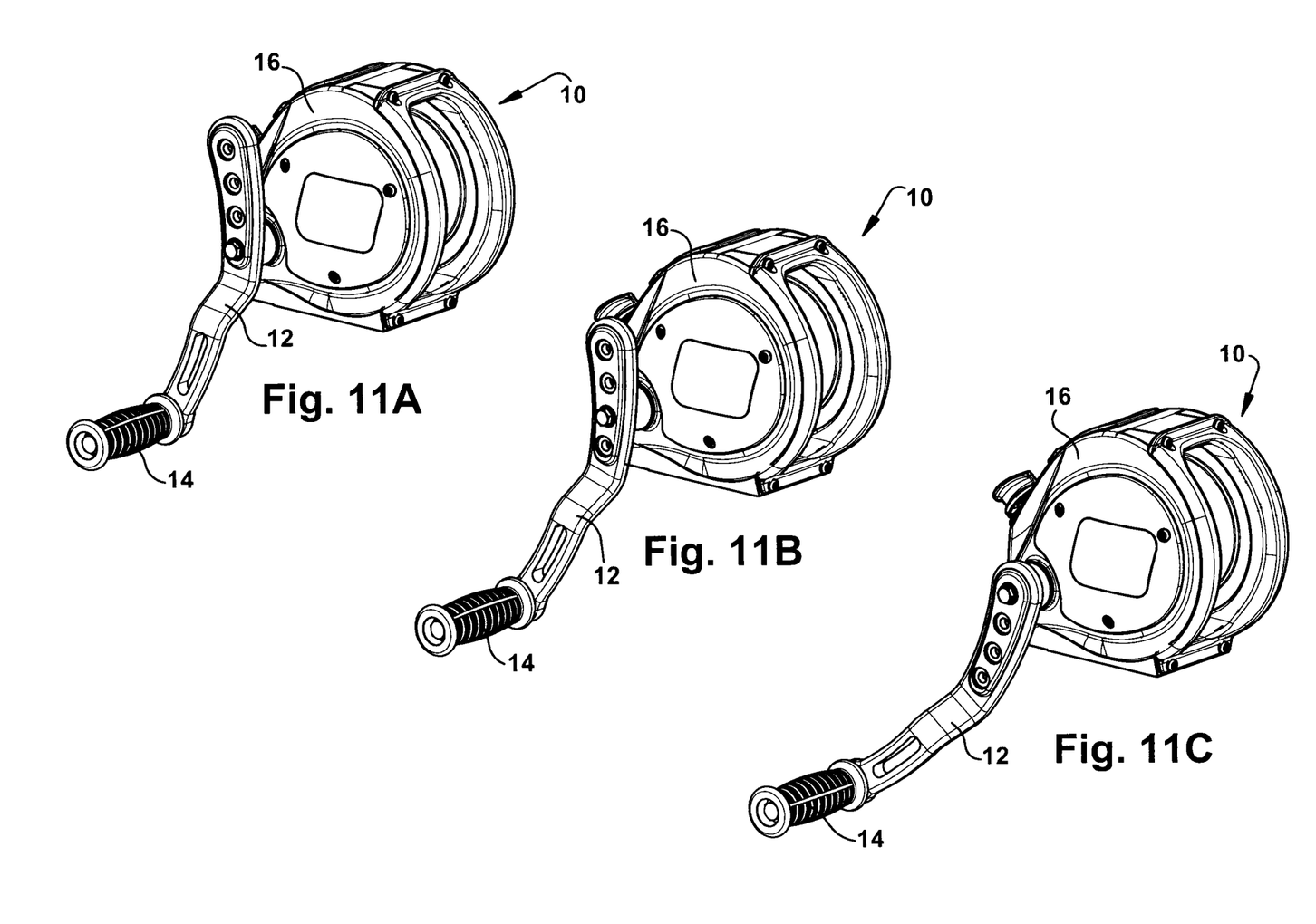
FIGS. 11A-11C are perspective views of a handle attached to a winch assembly at varying positions.

In addition, as illustrated in FIGS. 11A-11C, the handle 12 may also include a number of adjustment apertures 44 located along the handle 12. The handle 12 may thereby be positioned at a number of different positions via the adjustment apertures 44 to either shorten or lengthen the lever arm portion of the handle 12. As will be understood, between the varying lengths and attaching the handle 12 on the left and right sides of the winch assembly 10, the handle 12 may be assembled in a variety of positions depending on need and circumstances. Cap screws, washers, etc., as shown in the figures, may secure the handle 12 and retaining cap 42 to the winch assembly 10. In an embodiment, all components are assembled with a toleranced slip fit and are universal right to left for assembly purposes.

Typical ratchet pawl systems are only located on one side or the other of a winch thereby limiting the access if the operator is on the opposite side. In addition, most ratchet pawl systems are made of several loose components that may be cumbersome to assemble and replace if needed. The ratchet and pawl system 20 of the present application is located in the middle of the winch 10 thereby making it easily accessible from either side.

Figure 12A:
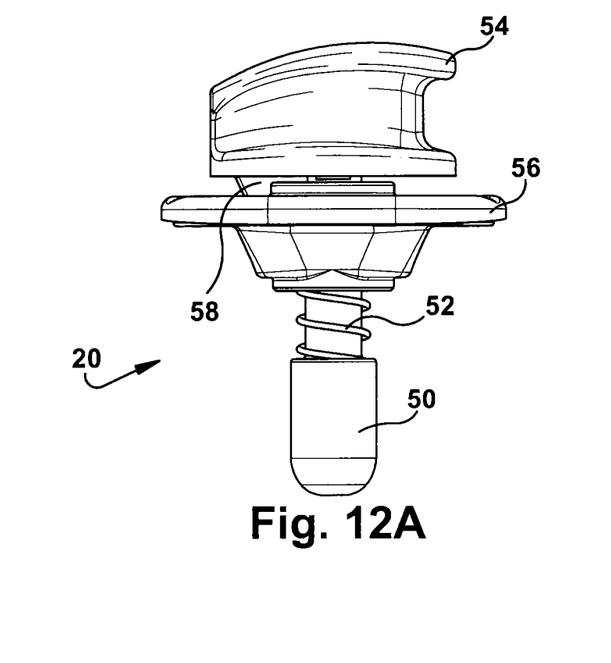
FIGS. 12A-12C are views of a ratchet system for a winch assembly.
Figure 12B:
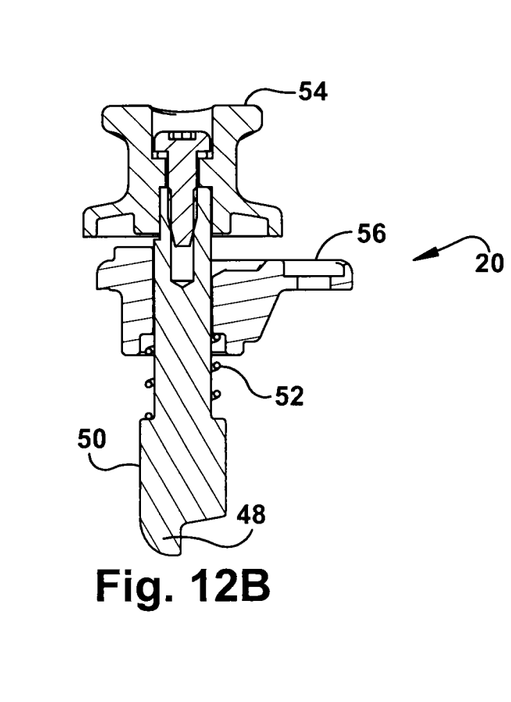
Figure 12C:
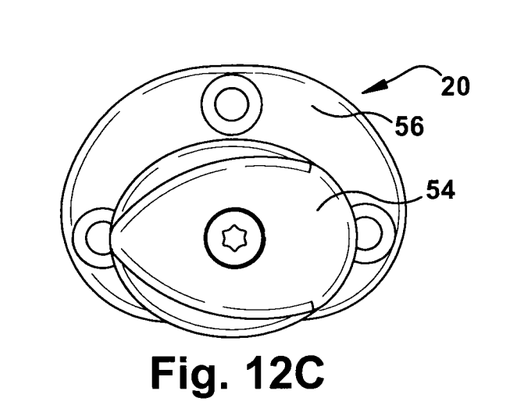

The ratchet and pawl system 20 may be mounted in the center of a symmetrical winch frame 16 as a separate and self-contained one piece assembly, as shown in FIGS. 12A-12C. Such positioning makes the ratchet and pawl system 20 accessible from either side of the assembly 10. The winch frame 16 may be made such that the ratchet pawl assembly 20 fits into the frame 16 protecting it. This frame 16 enclosure also enables strength characteristics allowing the pin 50 to be captured as close to the gear 34b as possible. The knob 54 has a protrusion 58, as best seen in FIGS. 4 and 12A, that works with the mating insert bushing 56 that will seat the neutral position and if turned partially, will ramp down into the desired engaged or disengaged position, so that the knob 54 may self align itself into place easily from the neutral position or if only turned partially.

Figure 5:
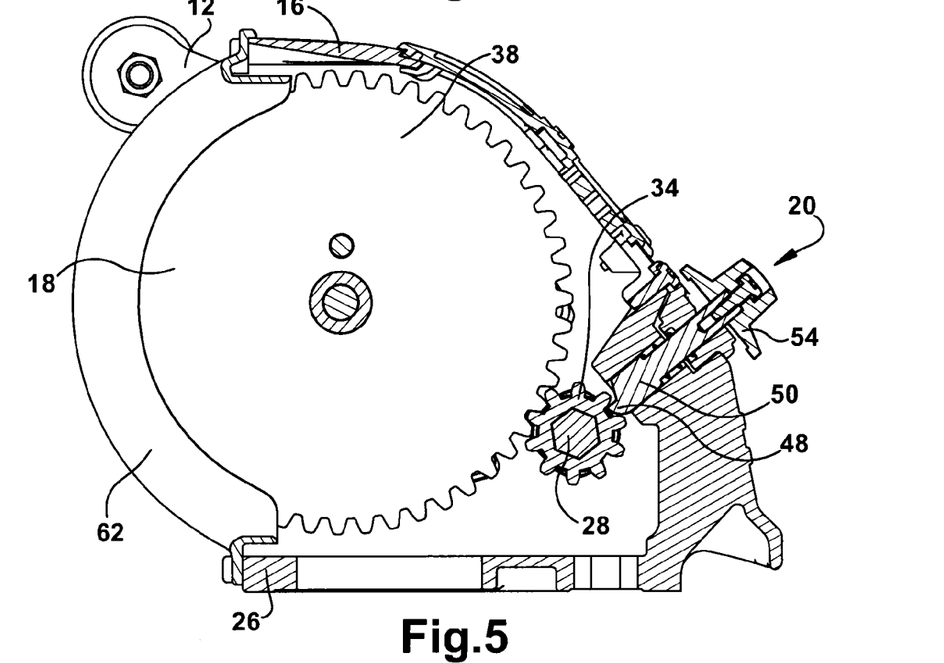
FIG. 5 is a cross-sectional view of the winch assembly taken along line 5-5 of FIG. 3.

As best shown in FIGS. 5 and 12B, the pin 50 may include a lip 48 located at one end. As will be understood, the lip 48 of the pin 50 may contact the middle drive gear or ratchet 34b and not the outer drive gears 34a, 34c, thus, reducing wear by spreading the contact points over several gears. The pin 50 may be in contact with a spring 52 and a knob 54. The pin 50 may pass through a bushing 56 such that the knob 54 is accessible from the outside of the housing 16; however, the pin 50 is located within the housing 16.

Figure 2:
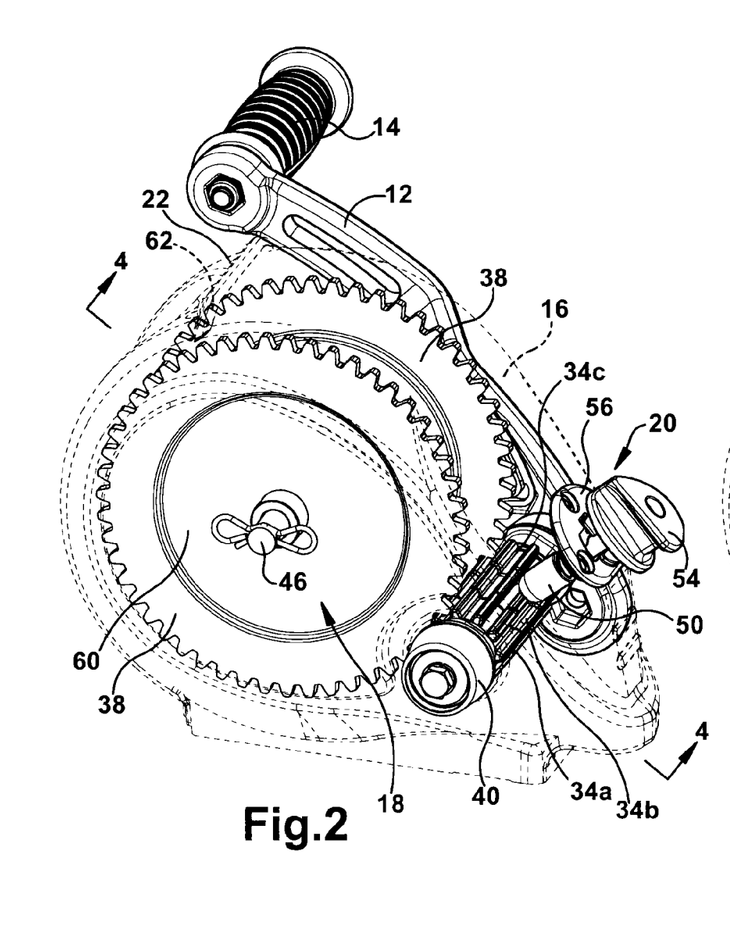
FIG. 2 is a perspective view of internal mechanisms of the winch assembly of FIG. 1.
Figure 3:
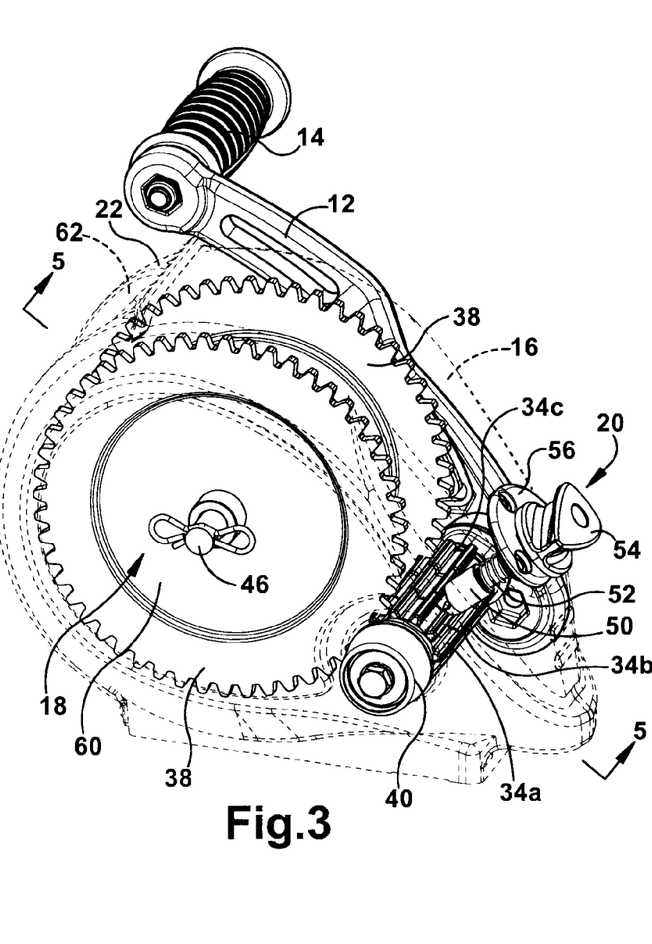
FIG. 3 is a perspective view of internal mechanisms of the winch assembly of FIG. 1.
Figure 4:
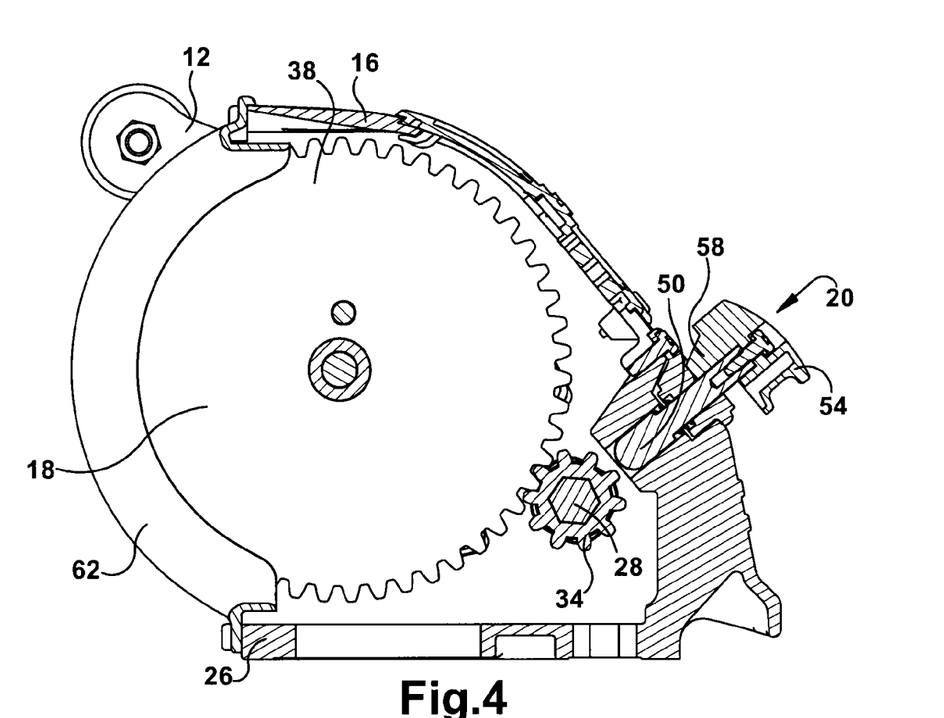
FIG. 4 is a cross-sectional view of the winch assembly taken along line 4-4 of FIG. 2.

The bushing 56 and knob 54 may be arranged such that features on the bushing 56 and knob 54 provide for the knob 54 to be selectively positioned to engage the pin 50 with the middle drive gear or ratchet 34b (as seen in FIGS. 3 and 5) or be selectively positioned to disengage the pin 50 from the ratchet 34b (as seen in FIGS. 2 and 4). In one embodiment, the spring 52 may bias the pin 50 into engagement with the ratchet 34b. The system 20 may also be arranged to self align for easy placement of the pin 50 in contact with the middle drive gear or ratchet 34b when the knob 54 is only partially turned.

In one embodiment, for example, the ratchet and pawl system 20 may be positioned generally through the centerline of a symmetrical winch assembly 10 and is a separate, self-contained assembly. The winch frame 16 may be arranged such that the ratchet and pawl system 20 may be housed within the frame 16 to prevent unnecessary damage to components. Such positioning also allows for a shorter pin 50 because of its proximity to the ratchet 34b. Such an arrangement places less bending forces on the pin 50 and increases the service life of the pin 50.

Similar to the description above, the knob 54 may have a protrusion that mates with recesses in an insert component (such as a bushing) to seat the knob 54 in a neutral position, i.e., a position where the pin 50 is disengaged from the ratchet 34b. However, a partial turn of the knob 54 would allow the spring 52 to bias the pawl 50 into contact and engagement with the ratchet 34b.

As discussed above, the winch drum 18 may include a pair of drum gears 38 symmetrically positioned at the sides of the drum 18. The drum 18 may be manufactured or fabricated so that the drum gears 38 are integrally formed with the drum 18, i.e., the pair of drum gears 38 and the drum 18 are one singular, unitary component. Such fabrication eliminates the need for welding, riveting, or otherwise securing gears to a drum. The symmetric positioning of the drum gears 38 with respect to the drum 18, along with the dual drive gears 34 of the drive system encourages even loading and balancing of forces when the drum 18 is wound and unwound. Such even loading reduces or eliminates side load conditions that may damage the drum 18. Such balanced forces may increase the service life of the drum 18 and the drum gears 38.

Figure 6:
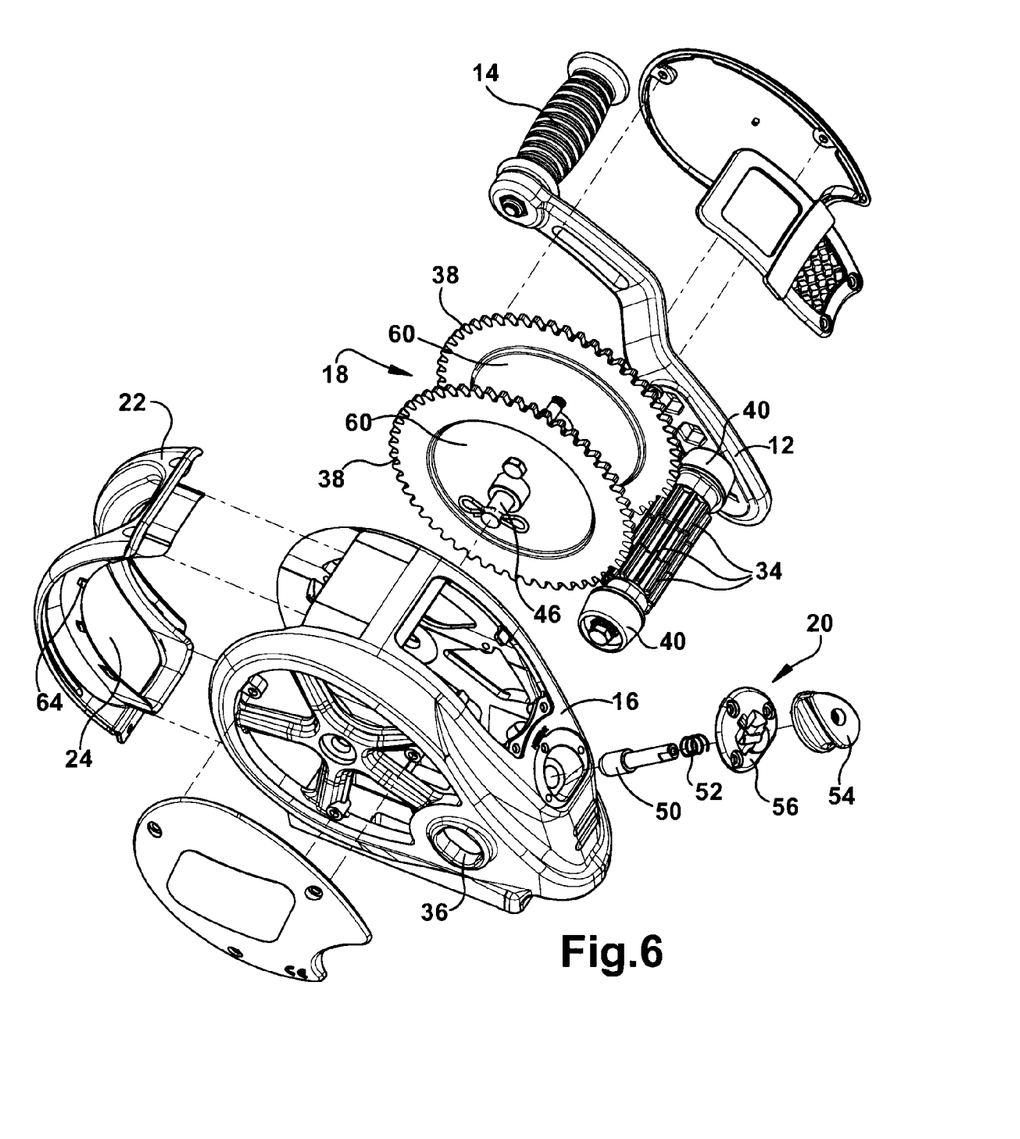
FIG. 6 is an exploded view of a winch assembly in an embodiment of the present invention.
Figure 9:
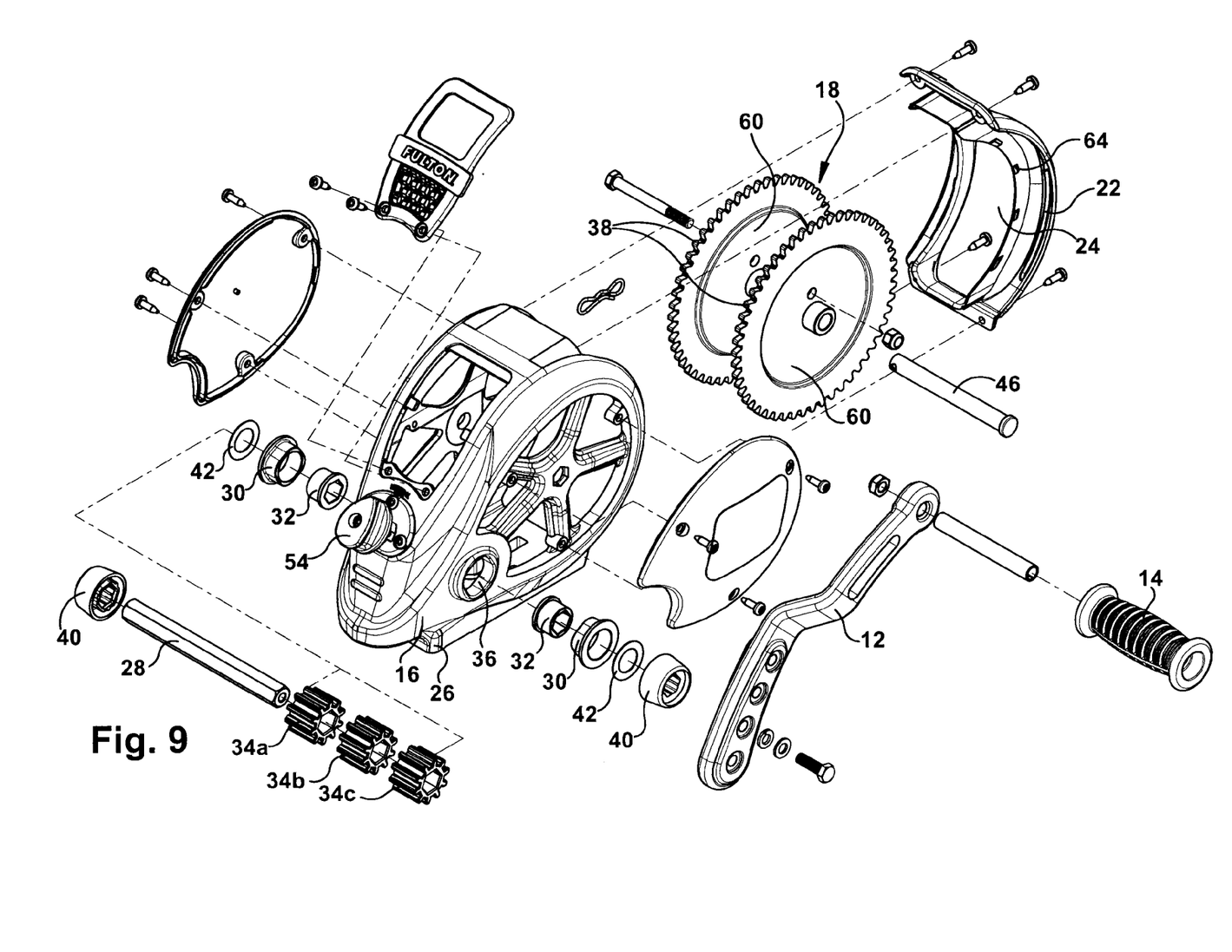
FIG. 9 is another exploded view of a winch assembly.

The drum 18, along with the rear cover 22, may guide the strap such that the strap experienced less wear and tear and is protected against grease from the gears and other contaminants. The drum 18 may include a sump 60 protruding from the inner side of each drum gear 38 (as best seen in FIGS. 6 and 9). The sump 60 may extend from the inner surface of the drum gears 38 so as to encourage a retracting strap towards the center of the drum 18 and away from the teeth of the drum gears 38.

Such an arrangement results in a reduction or elimination of instances when the strap engaging or becoming entangled with the drum gears 38, which would cause damage and other wear, along with potentially contaminating the strap with grease. In addition, as will be described in detail below, the sumped sides 60 also encourage a strap guide to nest inside the rear cover 22 further protecting the strap from wear and or contamination.

The winch assembly 10 may also include a rear cover 22 with an opening 24 to accommodate the winding and unwinding of a strap or cable from the winch drum 20. As best seen in cross-sectional views of FIGS. 4 and 5 and in FIG. 6, the an opening 24 may allow movement of the strap into and out of the winch assembly 10. The rear opening 24 may include material that wraps around the opening towards the drive gears 38 to form a strap guide 62.

The strap guide 62 may extend into the housing 16 sufficiently to protect the strap against contact with the drum gears 38, specifically protection against contact with the teeth of the drum gears 38. Thus, further protecting the strap from damage, wear, grease and contaminants. As will be understood, the strap guide 62 may provide the strap with a smooth, clean port for entry and exit from the winch assembly 10. The strap guide 62 may include protrusions 64 to protect the strap guide 62 from contacting the teeth of the drum gears 38. The protrusions 64 run on the smooth portion of the drum gears 38 and avoid contact with the gear teeth. In addition, the strap guides 62 may enclose the potentially sharp edges of the winch frame 16, further protecting the strap and uses of the winch assembly 10 from potential damage and injury.

The winch assembly 10 may be arranged so that it may be secured to a towing trailer or a winch stand without accessing the inside of the winch housing 16. Such an arrangement provides for easy and quick installation of a winch assembly 10 without concern for opening or accessing the housing 16, unwinding the strap, etc. A winch assembly 10 may be installed using fasteners such as bolts from the bottom of the winch assembly 10.

Figure 13A:
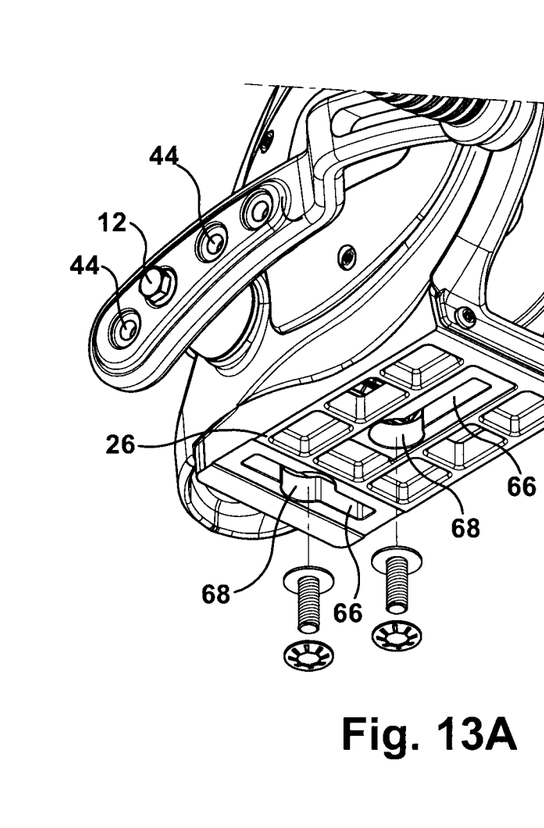
FIGS. 13A and 13B are perspective views of the bottom plate of a winch frame of a winch assembly.
Figure 13B:
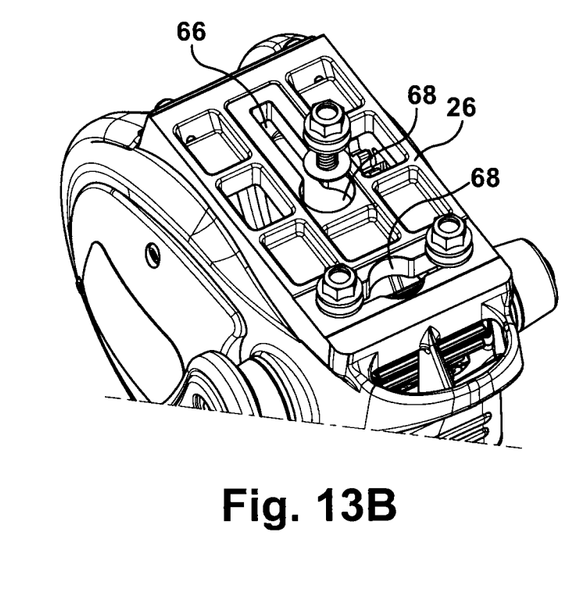
Figure 14A:
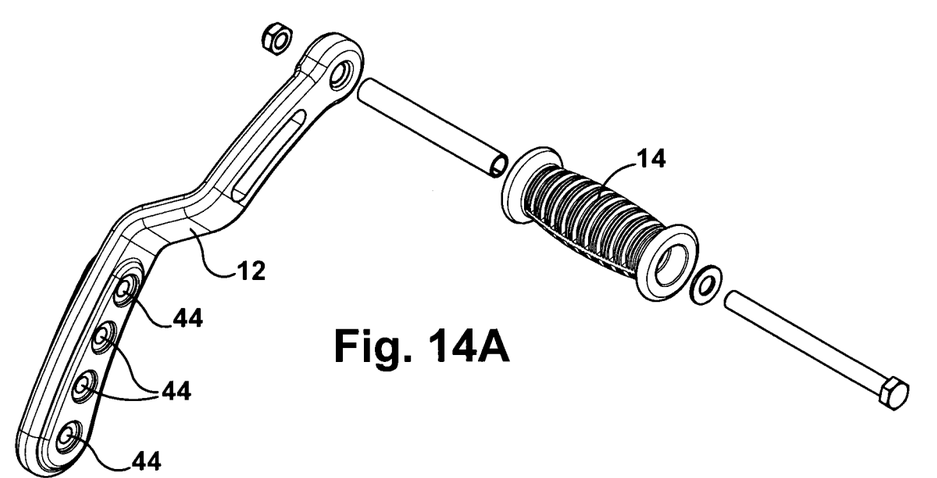
FIGS. 14A and 14B are perspective views of a handle for a winch assembly.
Figure 14B:
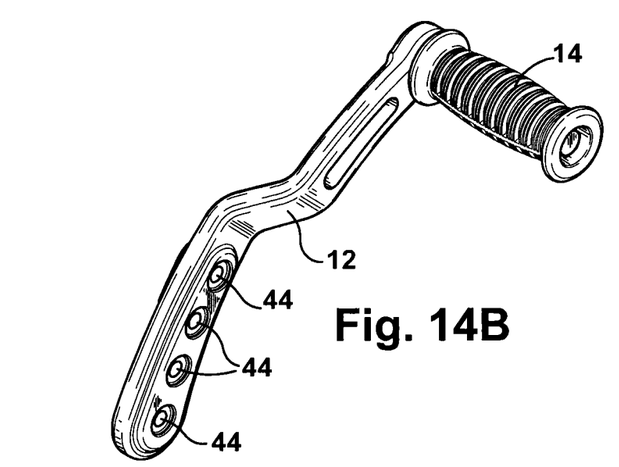
Figure 15:
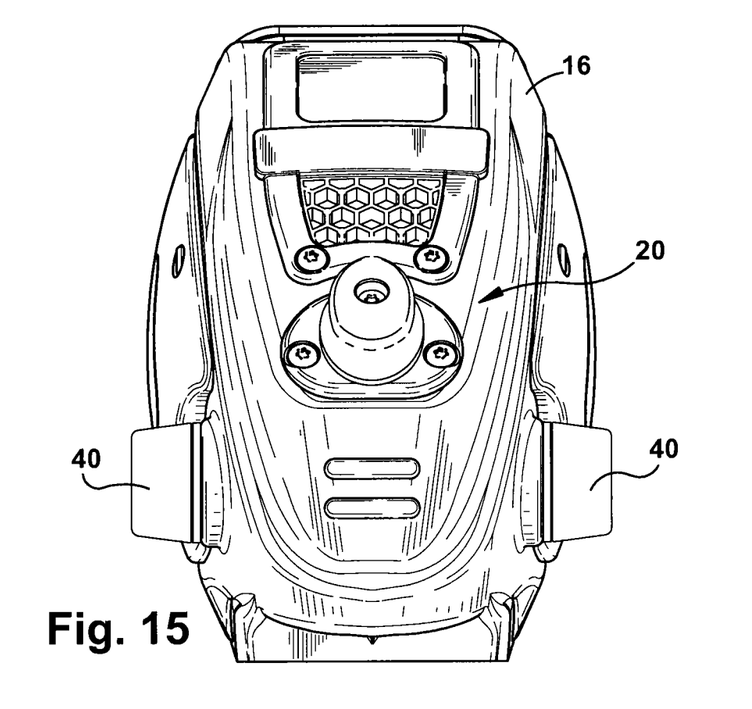
FIG. 15 is a front view of a partial winch assembly.
Figure 16:
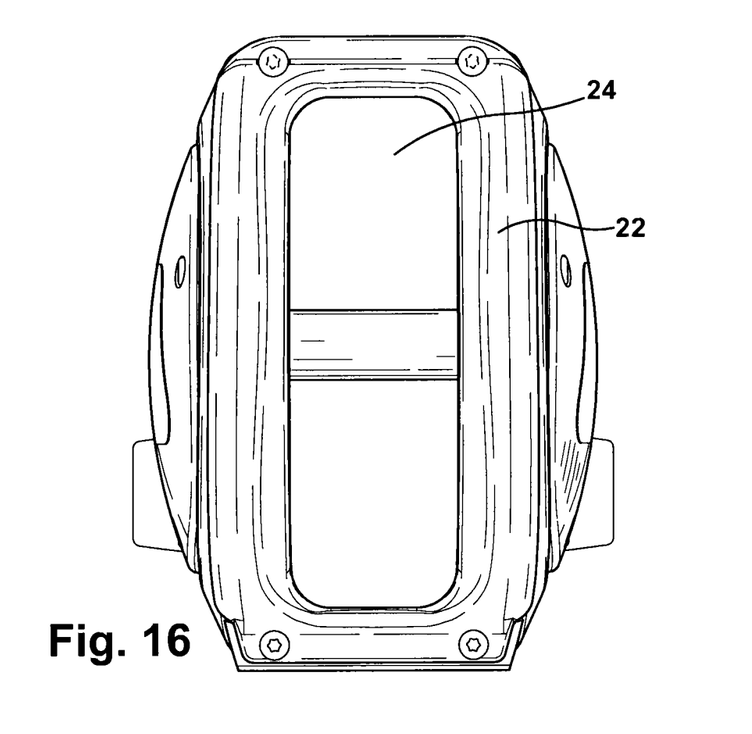
FIG. 16 is a rear view of a partial winch assembly.
Figure 17:
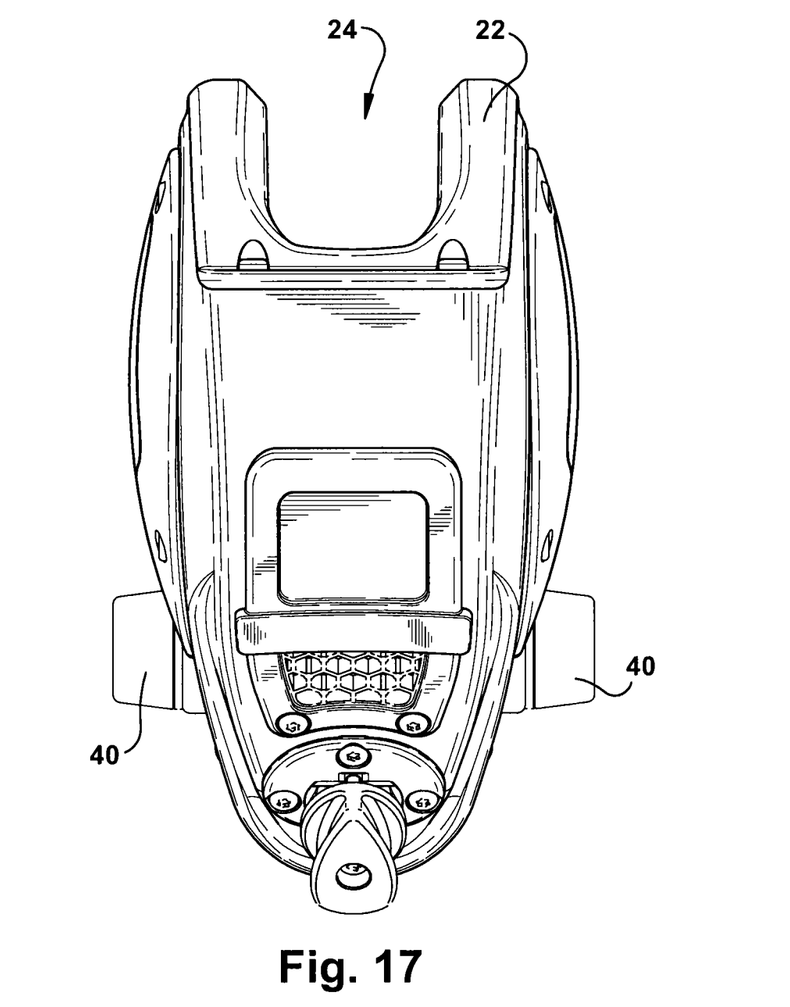
FIG. 17 is a top view of a partial winch assembly.

As is best seen in FIGS. 13A and 13B, the winch assembly 10 may include an easy install system. In a traditional mounting application, the fasteners have to be installed in through the inside of the winch. This is sometimes cumbersome due to several components on the inside of the winch. Making matters more difficult to access the mounting holes is when a winch line is fully wound onto the drum. With this limited inside access, being able to hold down the head of the bolts is sometimes a problem when trying to tighten the nuts from the bottom side. Sometimes parts of the winch may need to be disassembled to complete the installation.

In the present invention, an installer may insert bolts from the bottom of the winch 10, place the winch assembly 10 onto a winch or mounting stand, and attach the nuts from the bottom side. The bottom plate 26 of the frame 16 may include a series of grooves 66 and apertures 68 that allow the bolts to be held in place until the nuts can be threaded onto the bolts. This is accomplished by the heads of bolts fitting through apertures 68 and allowing for the shaft of the bolt to slide along the grooves 66. The grooves 66 along with the square necks of fasteners, such as carriage bolts, may prevent these bolts from spinning while tightening. Thus, simplifying installation and requiring less tools.

Although the preferred embodiment of the present invention has been illustrated in the accompanying drawings and described in the foregoing detailed description, it is to be understood that the present invention is not to be limited to just the preferred embodiment disclosed, but that the invention described herein is capable of numerous rearrangements, modifications and substitutions without departing from the scope of the claims hereafter.

Having thus described the invention, we claim:

1. A winch assembly comprising:
   a one-piece frame having at least one side, said one piece frame comprising:
     a first aperture having a winch drum shaft held therein;
     a second aperture having a drive gear shaft held therein;
     a pawl aperture having a pin assembly held therein; and
     a plurality of spokes arranged to suspend said first aperture;
   a drive system located within said frame, said drive system comprising:
     a winch drum; and
     at least one drive gear capable of engagement with said winch drum.

2. The winch assembly of claim 1 further comprising an adjustable handle that may be assembled to either side of said frame to permit use on either side of said frame.

3. The winch assembly of claim 2, wherein said handle includes at least one adjustment aperture permitting said handle to be rotated about varying locations along said handle.

4. The winch assembly of claim 1, wherein said one-piece frame further comprises a base plate located on a bottom side of said frame, wherein said base plate includes grooves and apertures to facilitate attachment to a trailer or winch stand.

5. The winch assembly of claim 4 wherein said grooves include a first groove and a second groove arranged approximately perpendicular to said first groove, wherein said first and second grooves facilitate alignment with said trailer or winch stand during attachment.

6. The winch assembly of claim 1, wherein said at least one drive gear comprises an inner drive gear located between two outer drive gears, wherein said inner drive gear and said two outer drive gears are independently operable of one another.

7. The winch assembly of claim 6, wherein said pin assembly includes a pin located through said frame, wherein said pin is capable of engagement with said inner drive gear.

8. The winch assembly of claim 1, wherein said one piece frame further comprises a strap guide connection member, wherein said strap guide connection member protects a strap insertable within said frame against contact with said winch drum.

9. A winch assembly comprising:
   a frame;
   a drive system located within said frame, said drive system comprising:
     a winch drum including at least one drum gear;
     a drive shaft; and
     at least one drive gear located on said drive shaft and capable of engagement with said at least one drum gear; and
   a pin located through said frame, wherein said pin is capable of engagement with a feature of said drive system other than said at least one drive gear, and wherein said engagement limits rotation of said drive system.

10. The winch assembly of claim 9, further comprising a pair of inner bearings located on either end of said drive shaft and a pair of outer bearings located adjacent said inner bearings on said drive shaft, wherein said inner and outer bearings support said drive shaft within said frame.

11. The winch assembly of claim 9, wherein said winch drum includes a sump protruding from an inner side of said at least one drum gear, wherein said sump encourages a strap insertable into said frame away from said at least one drum gear.

12. The winch assembly of claim 9, wherein said at least one drive gear includes at least one outer drive gear and said feature of said drive assembly is an inner drive gear located on said drive shaft and positioned adjacent said at least one outer drive gear, wherein said inner drive gear and said at least one outer drive gear are interpedently operable of one another.

13. The winch assembly of claim 12 further comprising a pawl system located in said frame and capable of engagement with said drive system, said pawl system comprising:
   a pawl located through a bushing, wherein said pawl is capable of engagement with said inner drive gear; and
   a knob located at an end of said pawl and capable of causing said pawl to engage and disengage with said inner drive gear.

14. The winch assembly of claim 13, wherein said bushing and knob provide for said knob to be selectively positioned to engage said pawl with said inner drive gear and be selectively positioned to disengage said pawl from said inner drive gear.

15. The winch assembly of claim 14, wherein said pawl system further includes a spring capable of biasing said pawl into engagement with said inner drive gear.

16. A winch assembly comprising:
   a frame;
   a drive system located within said frame, said drive system comprising:
     a winch drum including at least one drum gear;
     a drive shaft; and
     at least one drive gear located on said drive shaft and capable of engagement with said at least one drum gear;
   a ratchet and pawl assembly connected to said frame, said ratchet and pawl assembly comprising:
     a pin, wherein said pin is movable to engage said drive system to limit rotation of said drive shaft;
     a biasing member engaging said pin, said biasing member capable of biasing said pin into engagement with said drive system; and
     a knob connected to said pin to adjust said pin between a first position to allow rotation of said drive shaft in a first direction, a second position to allow rotation of said drive shaft in a second direction opposite said first direction, and a third position to allow rotation of said drive shaft in either said first or second directions.

17. The winch assembly of claim 16, wherein said ratchet and pawl assembly is detachable from said frame as a one-piece assembly.

18. The winch assembly of claim 16, wherein said ratchet and pawl assembly is mounted along a center line of said frame.

19. The winch assembly of claim 16 further comprising one or more retaining features in said knob, wherein said retaining features are capable of seating said knob into at least one of said first position, said second position, and said third position.

20. A winch assembly comprising:
   a frame having at least two sides and a front face positioned between said two sides;
   a drive system located within said frame, said drive system comprising:
      a winch drum including at least one drum gear;
      a drive shaft; and
      at least one drive gear located on said drive shaft and capable of engagement with said at least one drum gear;
   a pin connected with said frame, wherein said pin is movable to engage said drive system to limit rotation of said drive shaft; and
   a handle connected to said drive shaft to facilitate manual rotation of said drive shaft;
   wherein said pin is located on said front face and approximately centered between said two sides of said frame.

21. The winch assembly of claim 20, wherein said handle is adjustably connected to said drive shaft.

22. The winch assembly of claim 20, wherein said handle is connectable to said drive shaft on either of said two sides of said frame.

23. A winch assembly comprising:
   a frame;
   a drive system located within said frame, said drive system comprising:
      a winch drum including at least one drum gear;
      a drive shaft; and
      at least one drive gear located on said drive shaft and capable of engagement with said at least one drum gear; and
   a handle connected to said drive shaft to facilitate rotation of said drive shaft, wherein said handle includes a plurality of attachment features positioned along its length for selective attachment of said handle to said drive shaft at any attachment feature position.

24. The winch assembly of claim 23, wherein said attachment features comprise a plurality of apertures.

25. The winch assembly of claim 23, wherein said drive shaft includes a first end and a second end, and further wherein said handle is connectable to either said first end or said second end of said drive shaft.

26. A winch assembly comprising:
   a frame;
   a drive system located within said frame, said drive system comprising:
      a winch drum including at least one drum gear, wherein each of said at least one drum gear includes a plurality of teeth;
      a drive shaft; and
      at least one drive gear located on said drive shaft and capable of engagement with said at least one drum gear;
   a strap connected to said winch drum and capable of being wound on itself about said winch drum; and
   a strap guide connected to said frame, said strap guide positioned to overlap said teeth of said at least one drum gear to prevent said strap from contacting said teeth.

27. The winch assembly of claim 26, wherein said strap guide wraps around an exterior corner of said frame.

28. A winch assembly comprising:
   a one-piece frame enclosed on at least three sides;
   a drive system positioned within said frame, said dive system comprising:
      a winch drum having a periphery;
      a drive shaft; and
      at least one drive gear located on said drive shaft and capable of engagement with said winch drum; and
   wherein said frame circumscribes an entire of said periphery of said winch drum.

\* \* \* \* \*